(No Model.)

J. H. RICKETTS.
HAT TAG.

No. 437,132. Patented Sept. 23, 1890.

WITNESSES:
John M. Deemer
C. Sedgwick

INVENTOR:
J. H. Ricketts
BY Munn & Co.
ATTORNEYS.

UNITED STATES PATENT OFFICE.

JOHN H. RICKETTS, OF PITTSTON, PENNSYLVANIA.

HAT-TAG.

SPECIFICATION forming part of Letters Patent No. 437,132, dated September 23, 1890.

Application filed March 4, 1890. Serial No. 342,559. (No specimens.)

*To all whom it may concern:*

Be it known that I, JOHN H. RICKETTS, of Pittston, in the county of Luzerne and State of Pennsylvania, have invented a new and useful Improvement in Hat-Tags, of which the following is a full, clear, and exact description.

My invention relates to a hat-tag, and has for its object to provide a device capable of attachment to the sweat-band of a hat or cap and adapted to contain, for instance, the wearer's name and residence or other desired information.

A further object of the invention is to so construct and attach the device that it may be concealed between the sweat-band and crown of the hat without inconvenience to the wearer and carried upward in full view above the sweat-band when occasion may demand.

The invention consists in a tag of novel construction, as will be hereinafter fully set forth, and pointed out in the claims.

Reference is to be had to the accompanying drawings, forming a part of this specification, in which similar figures of reference indicate corresponding parts in all the views.

Figure 1:
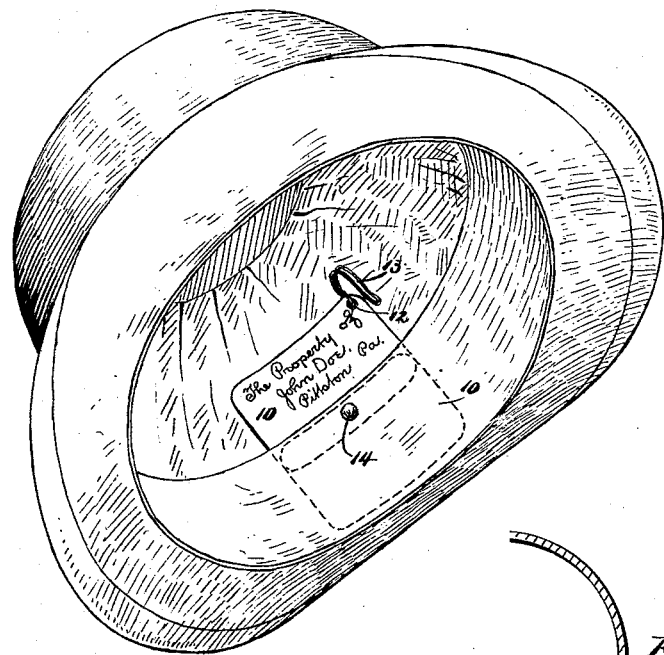
Figures 2, 3:
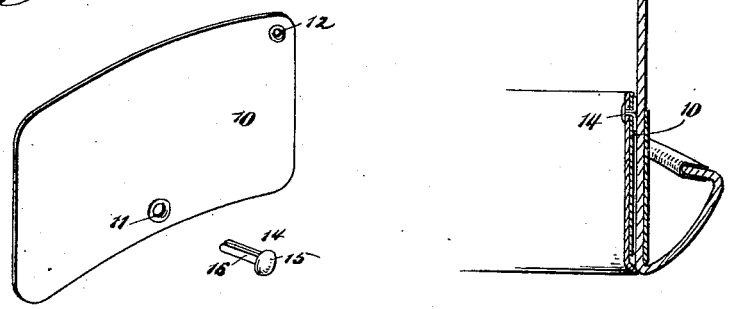

Figure 1 is a perspective view of a hat viewed from the under side, illustrating the attachment of the tag, the tag being shown in full view. Fig. 2 is a vertical section through one side of the hat and also a section through the tag, illustrating the manner of attaching the tag to the sweat-band, and also showing the tag as concealed behind the said band; and Fig. 3 is a perspective view of the tag detached and of the pin employed to attach the tag to the sweat-band.

The tag 10 consists of a piece of water-proof material—such as celluloid, zylonite, metal, rubber, or their equivalent—the said material being preferably cut to a rectangular shape and having its corners rounded or not. The tag may be of any desired length; but the width of the tag is ordinarily made to correspond, practically, to the width of the sweat-band, and the tag is curved longitudinally from end to end sufficiently to correspond with the curved inner face of the hat-crown back of the sweat-band. Thus when the tag is placed in position, as will be hereinafter stated, its presence does not interfere in the least with the comfort of the wearer of the hat. Between the ends of the tag, near one side, preferably at the center, an eyeleted opening 11 is formed, and a second eyeleted opening 12 is ordinarily produced in what I designate one of the "upper corners" of the tag. In the second eyeleted opening 12 a ribbon 13 or its equivalent is secured to assist in the manipulation of the tag.

In connection with the tag I employ a pivot-pin 14, the form of pin preferred being illustrated in detail in Fig. 3 and consisting of a head 15 and two pliable members 16, extending from the rear of the head. In practice it is purposed to form the head of a material such as celluloid, metal, rubber, or bone, the said head being colored to correspond with the color of the sweat-band of the hat.

The tag is applied in the following manner: The members of the pin 14 are passed through the sweat-band at the side of the hat and near the upper end, and also through the eyeleted opening 11 of the tag. The members are thereupon clinched or bent in opposite directions upon the inner surface of the tag, as illustrated in Fig. 2.

In ordinary use the tag is turned downward upon its pivot-pin until it is concealed behind the sweat-band, as shown in dotted lines, Fig. 1, and in positive lines, Fig. 2; but when it is desired to determine the ownership of the hat or cap, for instance, by grasping the ribbon 13 the tag may be drawn upward and outward from behind the sweat-band to fully expose any matter printed upon the face of the card.

It will be observed that the device is practical, simple, and capable of being applied to any hat or cap without discomfort to the wearer thereof, as has been heretofore stated.

Having thus described my invention, I claim as new and desire to secure by Letters Patent—

1. As an improved article of manufacture, a hat-tag consisting of a strip of suitable material curved to correspond with the curved inner face of the hat-crown back of the sweat-band and provided with an aperture near the edge for attaching it to the sweat-band, as set forth.

2. As an improved article of manufacture, a hat-tag consisting of a piece of celluloid or its stated equivalent curved to correspond with the curved inner face of the hat-crown back of the sweat-band and provided with an aperture near the edge for attaching it to the sweat-band, as specified.

3. As an improved article of manufacture, a hat-tag consisting of a rectangular piece of celluloid or its stated equivalent curved longitudinally to correspond with the curved inner face of the hat-crown back of the sweat-band and provided with an aperture at about the middle of its length and near one edge for attaching it to the sweat-band and with an aperture in one corner for receiving a ribbon or the like, as set forth.

4. The combination, with a hat-crown and its sweat-band, of a water-proof tag curved longitudinally and provided near one side edge with an eyeleted opening and in one corner with another opening, the said tag being located between the sweat-band and the hat-crown, a pivot-pin passed through the upper edge of the sweat-band and the eyeleted tag, and means, substantially as shown and described, for manipulating the said tag, as and for the purpose specified.

JOHN H. RICKETTS.

Witnesses:
WM. L. McDOUGALL,
EDWARD F. GRUBE.